(12) United States Patent
Navarrete Michelini et al.

(10) Patent No.: US 11,893,710 B2
(45) Date of Patent: Feb. 6, 2024

(54) IMAGE RECONSTRUCTION METHOD, ELECTRONIC DEVICE AND COMPUTER-READABLE STORAGE MEDIUM

(71) Applicant: BOE TECHNOLOGY GROUP CO., LTD., Beijing (CN)

(72) Inventors: Pablo Navarrete Michelini, Beijing (CN); Wenhao Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 382 days.

(21) Appl. No.: 17/433,178

(22) PCT Filed: Nov. 16, 2020

(86) PCT No.: PCT/CN2020/129145
§ 371 (c)(1),
(2) Date: Aug. 23, 2021

(87) PCT Pub. No.: WO2022/099710
PCT Pub. Date: May 19, 2022

(65) Prior Publication Data
US 2022/0351333 A1  Nov. 3, 2022

(51) Int. Cl.
*G06T 3/40* (2006.01)
*G06N 3/08* (2023.01)
*G06N 3/045* (2023.01)

(52) U.S. Cl.
CPC .......... *G06T 3/4076* (2013.01); *G06T 3/4046* (2013.01); *G06N 3/045* (2023.01); *G06N 3/08* (2013.01); *G06T 2207/20084* (2013.01)

(58) Field of Classification Search
CPC ... G06T 3/4046; G06T 3/4053; G06T 3/4076; G06T 2207/20084; G06N 3/045; G06N 3/08
See application file for complete search history.

(56) References Cited

U.S. PATENT DOCUMENTS 11,361,403 B2 * 6/2022 Kalchbrenner ........ G06N 20/00
2014/0375836 A1 * 12/2014 Amitay ................. G06T 3/4053
348/222.1
(Continued)

FOREIGN PATENT DOCUMENTS

CN  110458758 A  11/2019
CN  110770784 A  2/2020

OTHER PUBLICATIONS

Chen et al. "Guided dual networks for single image super-resolution." IEEE Access 8 (2020): 93608-93620. (Year: 2020).*

(Continued)

*Primary Examiner* — Katrina R Fujita
(74) *Attorney, Agent, or Firm* — Myers Bigel, P.A.

(57) ABSTRACT

The disclosure provides an image reconstruction method for an edge device, an electronic device and a storage medium. The image reconstruction method includes: extracting low-level features from an input image of a first scale to generate first feature maps, the first feature maps having a second scale greater than the first scale as compared with the input image; extracting low-level features from the input image to generate second feature maps, the second feature maps having the second scale; generating mask maps based on the second feature maps; generating intermediate feature maps based on the mask maps and the first feature maps, the intermediate feature maps having the second scale; synthesizing a reconstructed image having the second scale based on the intermediate feature maps. This method facilitates to achieve a better image super-resolution reconstruction effect with lower resource consumption.

20 Claims, 8 Drawing Sheets

(56) References Cited

U.S. PATENT DOCUMENTS

| | | | |
|---|---|---|---|
| 2019/0378242 A1 | 12/2019 | Zhang et al. | |
| 2020/0117949 A1 | 4/2020 | Kimura | |
| 2020/0336699 A1* | 10/2020 | Kim | G09G 5/005 |
| 2021/0133920 A1* | 5/2021 | Lee | G06T 3/0012 |
| 2021/0133926 A1* | 5/2021 | Jia | G06T 7/33 |
| 2021/0150669 A1* | 5/2021 | Potapov | G06T 3/4046 |
| 2021/0150678 A1* | 5/2021 | Yi | G06N 3/084 |
| 2021/0334642 A1* | 10/2021 | Navarrete Michelini | G06V 10/42 |
| 2022/0108425 A1* | 4/2022 | Chen | G06T 3/4053 |
| 2023/0076266 A1* | 3/2023 | Ying | G06N 3/08 |

OTHER PUBLICATIONS

Liu et al. "An attention-based approach for single image super resolution." 2018 24Th international conference on pattern recognition (ICPR). IEEE, 2018. (Year: 2018).*

Xie et al. "Holistically-nested edge detection." Proceedings of the IEEE international conference on computer vision. 2015. (Year: 2015).*

Zhang et al. "Deep gated attention networks for large-scale street-level scene segmentation." Pattern Recognition 88 (2019): 702-714. (Year: 2019).*

Zhou et al. "Edge intelligence: Paving the last mile of artificial intelligence with edge computing." Proceedings of the IEEE 107.8 (2019): 1738-1762. (Year: 2019).*

Dong, Chao, et al., "Image Super-Resolution Using Deep Convolutional Networks", downloaded from https://arxiv.org/abs/1501.00092v3, Jul. 31, 2015, 14 pp.

Li, Xin, et al., "New Edge-Directed Interpolation", IEEE Transactions on Image Processing, vol. 10, No. 10, Oct. 2001, pp. 1521-1527.

Vaswani, Ashish, et al., "Attention Is All You Need", downloaded from https://arxiv.org/abs/1706.03762v5, Dec. 6, 2017, 15 pp.

* cited by examiner

IMAGE RECONSTRUCTION METHOD, ELECTRONIC DEVICE AND COMPUTER-READABLE STORAGE MEDIUM

RELATED APPLICATION

The present application is the U.S. national phase entry of International Application No. PCT/CN2020/129145, with an international filing date of Nov. 16, 2020, the entire disclosure of which is incorporated herein by reference.

TECHNICAL FIELD

The disclosure relates to the field of image processing, and specifically to an image reconstruction method for an edge device, an electronic device and a computer-readable storage medium.

BACKGROUND

With the continuous development of deep learning and artificial intelligence (AI) technologies, there is a growing interest in implementing these technologies efficiently on edge devices such as mobile terminals. This trend is known as edge artificial intelligence (Edge-AI). Some tasks utilizing AI technologies such as image classification, object detection etc. have been successfully implemented on edge devices because the outputs involved (e.g., labels, bounding boxes, etc.) are all low dimensional.

Super resolution (SR) reconstruction of images has now become an important branch in the field of image processing. At present, methods for SR reconstruction of images are mainly interpolation-based methods and learning-based methods. However, since interpolation-based methods cannot introduce additional useful high-frequency information, they are prone to image blur in reconstructed images. Learning-based methods may utilize the relationship between low-resolution images and high-resolution images through learning to improve the resolution. However, due to large dimensional outputs or complicated network structures, the currently known learning-based methods result in high computational complexity, and thus may hardly be implemented on edge devices that have comparatively limited resources (e.g., storage resources and power resources) and computational capabilities.

SUMMARY

To this end, the disclosure provides a method, an electronic device and a storage medium capable of relieving, alleviating or even eliminating the above problems.

According to one aspect of the disclosure, an image reconstruction method for an edge device is provided, the method comprising: extracting low-level features from an input image of a first scale to generate a plurality of first feature maps, the plurality of first feature maps having a second scale greater than the first scale as compared with the input image; extracting low-level features from the input image to generate a plurality of second feature maps, the plurality of second feature maps having the second scale; generating a plurality of mask maps based on the plurality of second feature maps; generating a plurality of intermediate feature maps based on the plurality of mask maps and the plurality of first feature maps, the plurality of intermediate feature maps having the second scale; and synthesizing a reconstructed image having the second scale based on the plurality of intermediate feature maps.

In some embodiments, said extracting low-level features from the input image to generate the plurality of first feature maps comprises: performing transposed convolution on the input image to generate the plurality of first feature maps; and said extracting low-level features from the input image to generate the plurality of second feature maps comprises: performing transposed convolution on the input image to generate the plurality of second feature maps.

In some embodiments, said performing transposed convolution on the input image to generate the plurality of first feature maps comprises: processing the input image with a single transposed-convolutional layer to generate the plurality of first feature maps; and said performing transposed convolution on the input image to generate the plurality of second feature maps comprises: processing the input image with a single transposed-convolutional layer to generate the plurality of second feature maps.

In some embodiments, said extracting low-level features from the input image to generate the plurality of first feature maps comprises: performing convolution on the input image to generate a plurality of first initial feature map groups, each first initial feature map group comprising a plurality of first initial feature maps and each first initial feature map having the first scale; for each first initial feature map group, generating a corresponding first feature map by shuffling the plurality of first initial feature maps comprised therein, and said extracting low-level features from the input image to generate the plurality of second feature maps comprises: performing convolution on the input image to generate a plurality of second initial feature map groups, each second initial feature map group comprising a plurality of second initial feature maps and each second initial feature map having the first scale; for each second initial feature map group, generating a corresponding second feature map by shuffling the plurality of second initial feature maps comprised therein.

In some embodiments, said performing convolution on the input image to generate the plurality of first initial feature map groups comprises: convolving the input image by using a single convolutional layer to generate the plurality of first initial feature map groups; and said performing convolution on the input image to generate the plurality of second initial feature map groups comprises: convolving the input image by using a single convolutional layer to generate the plurality of second initial feature map groups.

In some embodiments, said performing convolution on the input image to generate the plurality of first initial feature map groups comprises: convolving the input image by using a single convolutional layer to generate the plurality of first initial feature map groups; and said performing convolution on the input image to generate the plurality of second initial feature map groups comprises: convolving the input image by using a first convolutional layer and a second convolutional layer to generate the plurality of second initial feature map groups.

In some embodiments, the number of first initial feature maps comprised in each first initial feature map group depends on a scaling ratio of the second scale to the first scale, and the number of second initial feature maps comprised in each second initial feature map group depends on a scaling ratio of the second scale to the first scale.

In some embodiments, correspondence exists between the plurality of mask maps and respective first feature maps, and each mask map characterizes a feature weight(s) of a corresponding first feature map in the plurality of first feature maps; and said generating the plurality of intermediate feature maps based on the plurality of mask maps and the plurality of first feature maps comprises: generating the plurality of intermediate feature maps by weighting each first feature map based on the feature weight(s) characterized by a corresponding mask map.

In some embodiments, the number of first feature maps, the number of second feature maps and the number of mask maps are the same, and the mask maps have the second scale.

In some embodiments, said generating the plurality of mask maps based on the plurality of second feature maps comprises: forming a plurality of feature element groups based on a plurality of feature elements in corresponding positions of the plurality of second feature maps; normalizing the feature elements in each feature element group, and generating the mask maps based on respective normalized feature elements.

In some embodiments, the mask maps are pixel-level maps, and each mask map has the second scale and comprises a feature weight for each pixel in a corresponding first feature map.

In some embodiments, the low-level features comprise at least one of texture feature, edge feature and spot feature of the input image.

In some embodiments, the input image is a luminance channel image of a color image to be reconstructed.

In some embodiments, steps of the method are executed by using a trained image reconstruction model, so as to reconstruct the input image into a super-resolution image.

In some embodiments, the image reconstruction model is trained by: inputting training data from a training sample set comprising reference images and degraded images to the image reconstruction model, to obtain output images; obtaining a total loss of the image reconstruction model based on a predetermined loss function according to the output images and the reference images; adjusting parameters of the image reconstruction model from an initial model according to the total loss so as to obtain a trained image reconstruction model.

According to another aspect of the disclosure, an electronic device is provided, comprising: a memory configured to store computer-executable instructions; and a processor configured to perform a image reconstruction method for an edge device as stated above when the computer-executable instructions are executed by the processor.

According to yet another aspect of the disclosure, a non-volatile computer-readable storage medium is provided, having computer-executable instructions stored thereon, and performing the image reconstruction method for an edge device as stated above when the computer-executable instructions are executed.

These and other aspects of the disclosure will be apparent from and elucidated with reference to the embodiments described hereinafter.

BRIEF DESCRIPTION OF DRAWINGS

More details, features and advantages of the disclosure will be disclosed in the description of exemplary embodiments with reference to the drawings, in which.

DETAILED DESCRIPTION

Prior to the detailed introduction of the embodiments of the disclosure, some related concepts will be explained first:

Edge device as used herein can refer to a device having computing resources and network resources and located between a data source(s) and a cloud service. For example, a user terminal device can be an edge device between humans and a cloud service, and a gateway can be an edge device between a smart home and a cloud center.

Edge AI as used herein can refer to application of AI algorithms, techniques and products at an edge side close to where data is generated, for example, construction of a convolutional neural network model in edge devices.

Image super-resolution as used herein can refer to a technique of reconstructing a high resolution (HR) image from a low resolution (LR) image by using an image processing method.

Convolutional neural network (CNN) (also called as convolutional network for short) as used herein can refer to a neural network structure that uses images as input/outputs and replaces scalar weights through convolutions (filters). In general, a convolutional neural network with 3 layers is considered shallow, whereas a network with the number of layers greater than 5 or 10 is usually considered deep.

Low-level feature as used herein can refer to a feature that can be extracted from a shallow layer(s) (e.g., the $1^{st}$-$3^{rd}$ layers) of a convolutional neural network, and sometimes also called as shallow-layer feature. A low-level feature usually corresponds to information to which the low-level visual center of a human is sensitive, e.g., edge information and so on.

Shuffle as used herein can refer to merging a group of images of a first scale into an image of a second scale greater than the first scale through pixel shuffle. As an example, $s^2$ small-scale images (each having a size of h×w) may be used to form a large-scale image with a size of sh×sw, in which an s×s image block may be composed by shuffling pixels in a same position of the $s^2$ small-scale images in a certain order.

It should be understood that "a plurality of" herein refers to at least two, i.e., two or more. The "scale" of images herein may be a scale described in term of resolution, or in terms of other similar physical quantities. It should also be understood that although terms such as first and second may be used to describe various devices, features or parts, these devices, features or parts should not be limited by these terms. These terms are only used to distinguish a device, feature or part from another device, feature or part.

Figure 1:
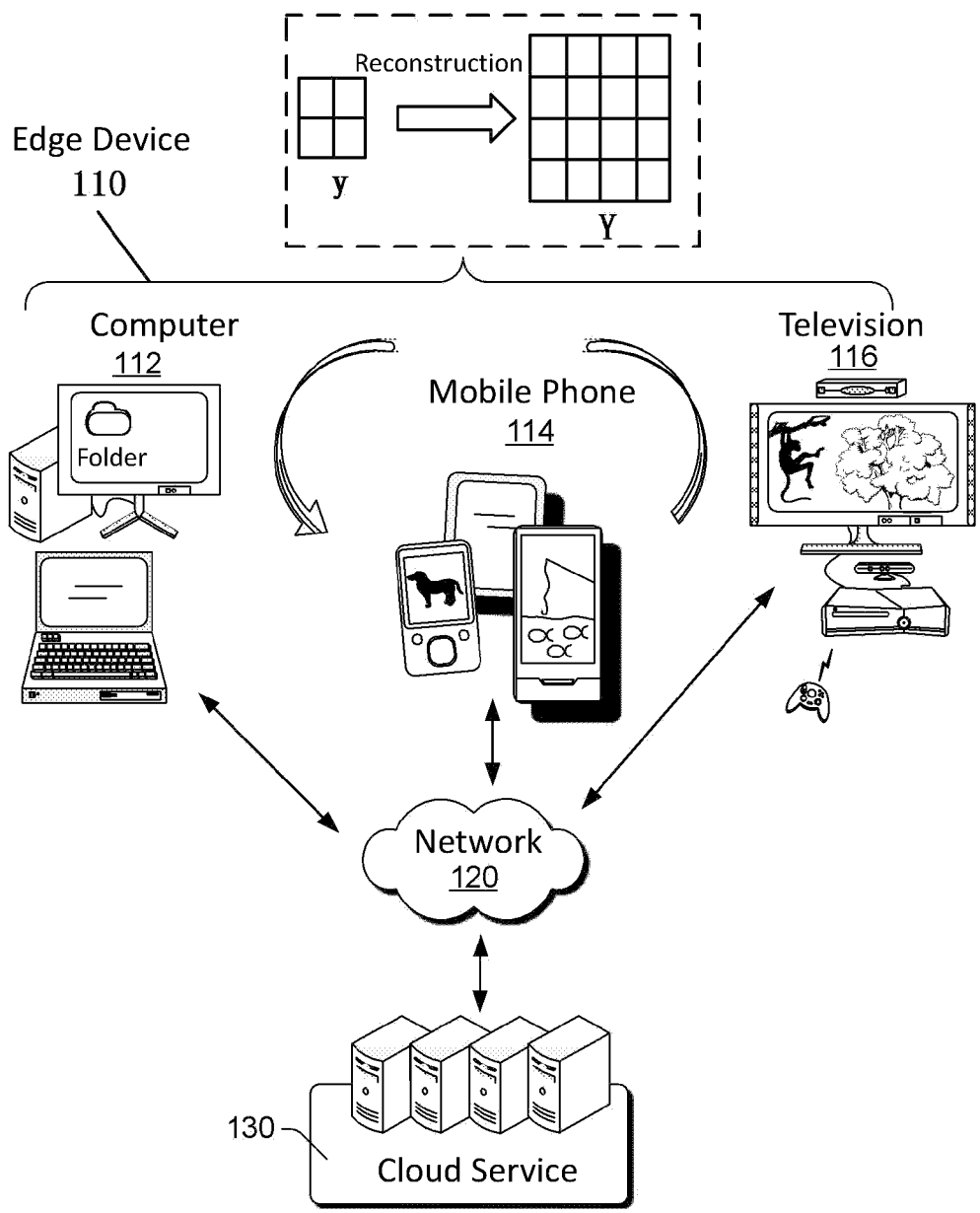
FIG. 1 schematically shows an exemplary scenario in which a technical solution of the disclosure may be applied.

FIG. 1 schematically shows an exemplary scenario 100 in which the technical solution of the disclosure can be applied. As shown in FIG. 1, the system shown in the scenario 100 may comprise an edge device 110, a network 120 and a cloud service 130. The edge device 110 is deployed on the edge of the entire system and may communicate with the cloud service 130 via the network 120. As compared with the cloud side, the edge device may provide more real-time and faster response as well as higher information security, but its storage capacity, computing capability and available energy (e.g., power resources) etc. are often limited, so it is not suitable for performing calculations that are overly complicated.

In FIG. 1, the edge device 110 is exemplified as a computer 112, a mobile phone 114 and a television 116. It may be understood that these are only schematic representations. Actually, the edge device 110 may be any edge device that is available to perform the image reconstruction technical solution provided in the disclosure, or a combination thereof. As an example, the edge device 110 may comprise a user terminal device and an Internet of Things (IoT) device, etc. The terminal user device may comprise, for example, desktop computers, laptop computers, tablet computers, mobile phones and other mobile devices, as well as wearable devices (for example, smart watches, smart glasses, headsets), etc. The IoT device may comprise any device capable of participating in an IoT system or network and/or communicating therewith, for instance, an equipment and a device associated with a vehicle (such as navigation systems, autonomous driving systems, etc.), an equipment, a device and/or an infrastructure associated with industrial manufacture and production, and various devices in smart entertainment systems (such as televisions, audio systems, electronic game systems), smart home or office systems, security systems, etc.

The edge device 110 may be used to implement AI algorithms, techniques and products. According to the embodiments of the disclosure, the edge device 110 is configured to perform super-resolution reconstruction of an input image y so as to obtain an upscaled reconstructed image Y. Exemplarily, the input image y may be received by the edge device 110 via a network from other devices, or the input image y may also be a locally stored image. Exemplarily, the input image y may be a picture or a frame image in a video, or an image obtained after preprocessing of a picture or a frame image in a video. Besides, exemplarily, the input image may be a single-channel grayscale image, or an image obtained based on one or more channels of a multi-channel image. For instance, the input image may be a Y-channel image for a color image comprising YUV-channel images.

In related arts, the image super-resolution reconstruction may be generally achieved by two methods, i.e., an interpolation method and a machine learning method. The former achieves upsampling of an image by inserting new elements between pixel points using a suitable interpolation algorithm based on pixels of the original image, e.g. using nearest neighbor interpolation, bilinear interpolation, mean interpolation, median interpolation etc. Such a method cannot bring more information about the original image, so the quality of the super-resolution reconstructed image will inevitably be affected. The latter usually achieves upsampling of an image by means of a machine learning model. Such a method may learn more features about the original image. However, the current machine learning models in use usually have complicated structures, and thus require a lot of computational resources and energy, so real-time performances of such application may not be achieved on an edge device.

According to the embodiments of the disclosure, a technical solution adapted to realize image super-resolution reconstruction on various edge devices with limited resources is provided, in which simpler learnable algorithms are adopted and a large number of edge AI devices may be used to perform image enhancement tasks.

Figure 2:
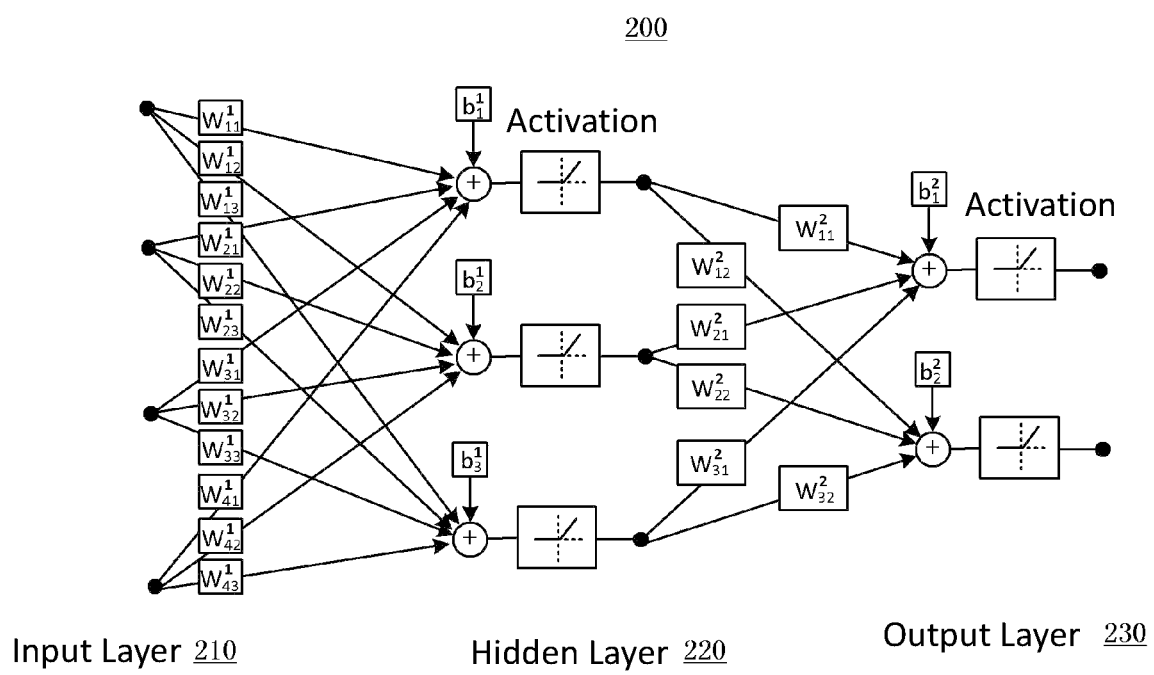
FIG. 2 schematically shows an exemplary structure of a convolutional neural network in related arts.

FIG. 2 schematically shows a structure of a convolutional neural network 200 used in an AI algorithm. The convolutional neural network 200 comprises an input layer 210, a hidden layer 220 and an output layer 230. The input layer 210 receives four input images. The hidden layer 220 comprises three convolutional units (corresponding to three output feature maps). The output layer 230 comprises two convolutional units and produces two output images. Each block with weights corresponds to a convolution unit/filter (e.g. of a 3×3 or 5×5 kernel), where k indicates the input layer number, and i and j indicate input and output units, respectively. The biases $b_i^k$ are scalars added to the outputs of respective convolutions. The result of adding several convolutions and a respective bias then passes through an activation block, which typically corresponds to a rectifying linear unit (ReLU), or sigmoid function, or hyperbolic tangent function, etc. Parameters of the filters and biases may be obtained through a training process using a set of input/output sample images, and adjusted to fit some optimization criteria, which may be determined according to specific applications. After being trained, the filters and biases may be fixed during operation of the system.

Figure 3:
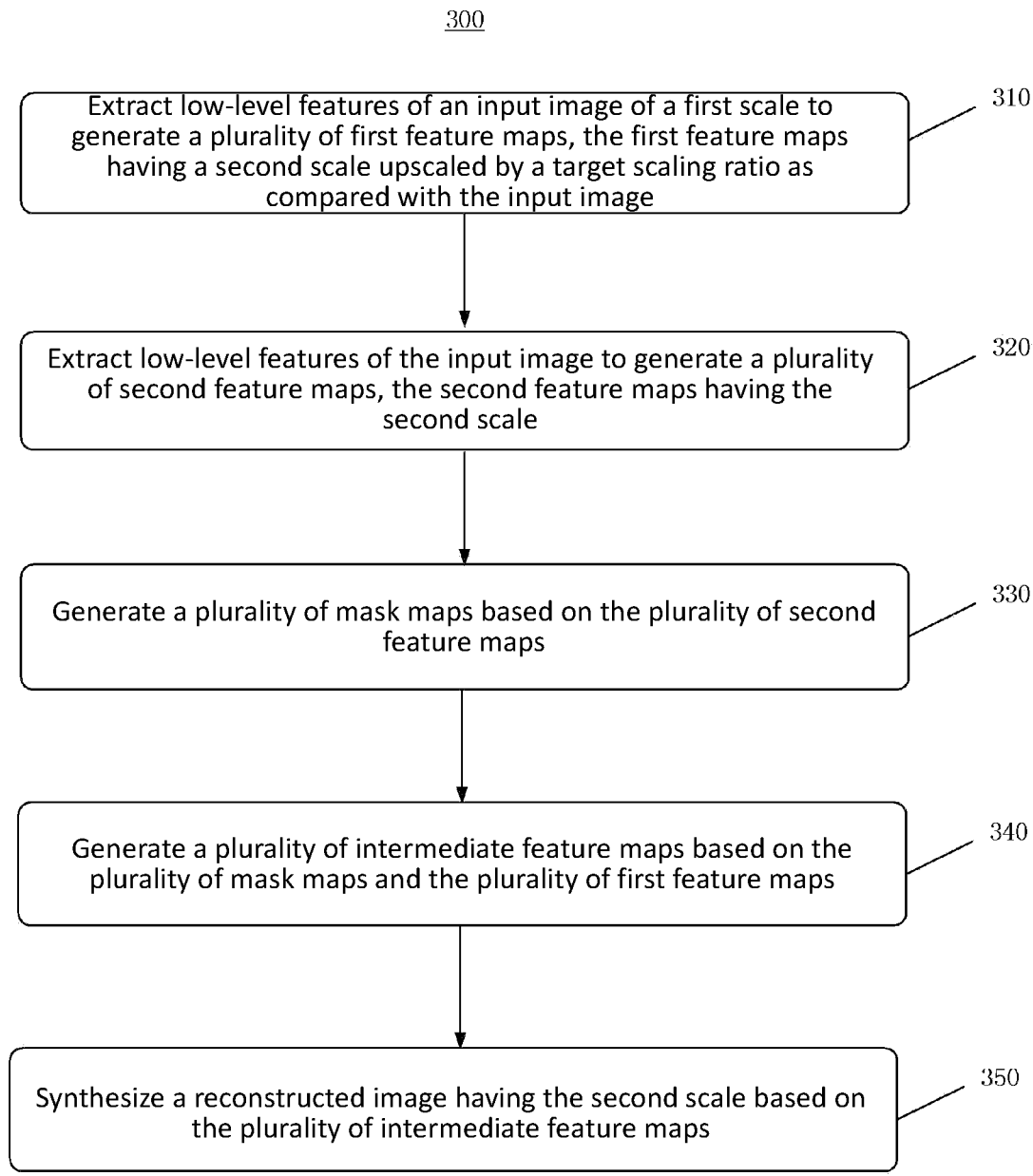
FIG. 3 schematically shows an exemplary flowchart of a method for image reconstruction according to some embodiments of the disclosure.

FIG. 3 schematically shows an exemplary flowchart of a method 300 for image reconstruction in an edge device according to some embodiments of the disclosure. The image reconstruction may be for example a super-resolution reconstruction of a high resolution (HR) image (e.g., 4 K: 3840*2160) from a low resolution (LR) image (e.g., 1080P: 1920*1080). In some embodiments, the image reconstruction may scale up a LR image by a required target scaling factor to obtain a reconstructed HR image.

In step 310, low-level features are extracted from an input image having a first scale to generate a plurality of first feature maps. The first feature maps have a second scale upscaled by a target scaling factor as compared with the input image. In an exemplary scenario of reconstructing a 4 K image from a 1080P image, the first scale may be: 1920*1080, and the second scale may be 3840*2160. Correspondingly, the target scaling factor is 2. In some embodiments, the input image may be a LR image obtained by the edge device from other devices or from a local memory, and it may comprise various types of images, such as landscape images, people images, building images, etc. In some embodiments, the input image may be a single-channel grayscale image. Alternatively, the input image may also be one of color-channel images of a color image, for example, the input image may be a Y-channel (i.e., a luminance channel) image of a color image comprising YUV color-channel images. Exemplarily, the edge device may directly extract a luminance channel from multiple-channel images to be reconstructed. For example, the luminance channel may be a channel characterizing luminance comprised in an image encoded in a color space such as YUV, YCbCr and Lab, for example, the Y channel in YUV or YCbCr and the L channel in Lab. Alternatively, the edge device may obtain a luminance channel according to a plurality of channels of multiple-channel images to be reconstructed. For example, for an RGB image, it may be converted to a color space such as YUV, YCbCr, or Lab based on values of its R, G, and B channels, and then the luminance channel may be extracted. Optionally, the luminance channel of an image may also be obtained in other suitable ways.

As used herein, a low-level feature may refer to underlying image detail features relative to high-level features such as image semantic features. Such features usually correspond to information sensed by the low-level visual center of a human. In some embodiments, the low-level features may comprise edge features, texture features and small spot features of an image. In an example of extracting image features by means of a convolutional neural network, the low-level features may be features extracted from a shallow layer (e.g., the first convolutional layer) of the convolutional neural network. In an example, the low-level features may be features outputted from a single hidden layer convolutional neural network (i.e. after convolution by a single convolutional layer).

In step 320, low-level features are extracted from the input image to generate a plurality of second feature maps. The second feature maps have the second scale upscaled by a same target scaling factor. The plurality of second feature maps correspond to the plurality of first feature maps. In some embodiments, the plurality of second feature maps correspond to the plurality of first feature maps one by one.

In step 330, a plurality of mask maps are generated based on the plurality of second feature maps. Each mask map may be used to characterize a feature weight(s) for a corresponding one of the first feature maps. The feature weight(s) may be used to indicate a degree of importance of a feature(s) for image reconstruction. The greater the weight is, the higher importance the feature has. Optionally, the feature weight(s) may be associated with sensibility of the human vision to a feature(s) in the image. The greater the weight is, the higher visual sensitivity the feature(s) has, and thus the more heavily enhanced it is during reconstruction.

In some embodiments, the plurality of mask maps are generated by normalizing the plurality of second feature maps. The mask maps may be pixel-level maps. Each mask map has the same second scale as the first feature map and comprises a feature weight for each pixel in a corresponding first feature map. In an example, a mask element in each mask map characterizes a feature weight of a pixel in a corresponding position of the corresponding first feature map.

In step 340, a plurality of intermediate feature maps are generated based on the plurality of mask maps and the plurality of first feature maps. The plurality of intermediate feature maps all have the second scale.

In step 350, a reconstructed image with the second scale is synthesized based on the plurality of intermediate feature maps.

In some embodiments, a reconstructed image with the second scale may be synthesized by weighting each of the first feature maps according to a feature weight(s) characterized by a corresponding mask map. The reconstructed image is an image resulting from super-resolution reconstruction. In some embodiments, when the mask maps are at pixel-level, the image pixel in a specific position of the reconstructed image may be obtained by weighted summing mask elements and feature elements in that specific position of the mask maps and respective first feature maps.

According to the solution of the disclosure, since a simpler learnable algorithm is adopted, edge devices that have been largely invested may be used to perform image enhancement tasks. In contrast to the existing deep learning solutions, since reconstruction from SR is achieved using only low-level features of images, the network structure involved is simpler and the amount of calculation required is smaller, and thus a simpler solution of a learnable system is achieved.

Moreover, by assigning different weights to feature maps of different feature channels at a feature element level (for example, a pixel level), the feature elements of important feature channels are enhanced, thereby ensuring the quality of the reconstructed image.

It should be understood that although FIG. 3 shows each step in an order, this is only exemplary. In fact, these steps may be performed in an order different from the order shown, for example, some of the steps may be performed in an order opposite to the order shown or performed in parallel. For example, step 310 and steps 320 and 330 may be performed in an opposite order or performed in parallel.

Figure 4:
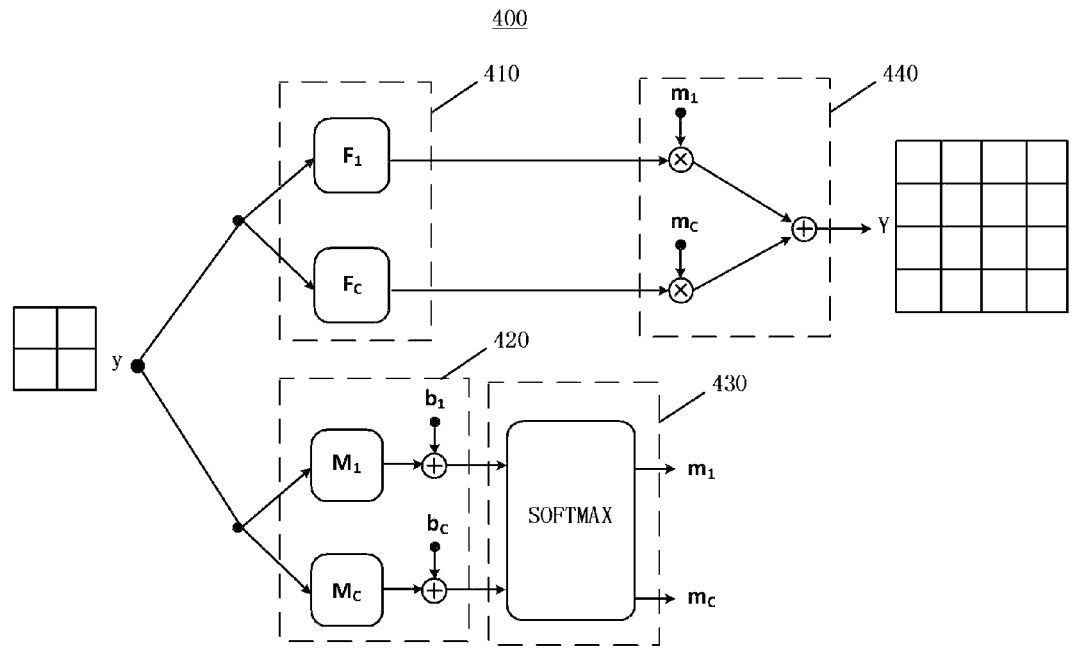
FIG. 4 schematically shows an exemplary structure of an image reconstruction model according to some embodiments of the disclosure.

FIG. 4 shows an exemplary structure of an image reconstruction model according to some embodiments of the disclosure. The image reconstruction model 400 comprises a first transposed-convolutional module 410, a second transposed-convolutional module 420, a normalizing module 430 and a weighted summing module 440. The image reconstruction model may be implemented by using a convolutional neural network.

The first transposed convolutional module 410 is used to extract low-level features of an input image y to generate a plurality of first feature maps. As shown in FIG. 4, the first transposed-convolutional module 410 may comprise C feature channels $F_1, \ldots, F_c$ (corresponding to C convolutional kernels) for applying transposed convolutions to the input image y respectively to generate C first feature maps $f_1, \ldots, f_c$. Since the applied convolutions are transposed convolutions, the first feature maps $f_1, \ldots, f_C$ are scaled up as compared with the input image y. Optionally, convolutional parameters used in the transposed convolutions such as scales of convolutional kernels, are determined based at least partially on a target upscaling ratio r. In some embodiments, in order to reduce computational complexity, the transposed convolution may be implemented by a single transposed-convolutional layer. In other words, for each of the feature channels, the transposed convolution of the input image may be performed by using only a single convolutional kernel, to obtain a corresponding first feature map, i.e., $F_1, \ldots, F_c$ in FIG. 4 correspond to single-convolutional kernels respectively. Exemplarily, a step of the transposed convolution may be set as s, the size of the convolutional kernel may be set as rk×rk, wherein r represents a target upscaling ratio of a reconstructed image Y to the input image y, and k represents a positive integer, such as 1, 2 and so on. Besides, the number C of the feature channels may be selected depending on actual needs, e.g., 4, 8, 16, etc.

The second transposed convolutional module 420 is used to extract low-level features from the input image y to generate a plurality of second feature maps. As shown in FIG. 4, similarly, the second transposed-convolutional module 420 may comprise C feature channels $M_1, \ldots, M_c$ for applying transposed convolutions to the input image y respectively to generate C second feature maps $m_1', \ldots, m_C'$. The C feature channels herein may correspond to the C feature channels in the first transposed-convolutional module 410 one by one. Since the applied convolutions are transposed convolutions, the second feature maps $m_1', \ldots, m_C'$ are scaled up as compared with the input image y. Optionally, the convolutional parameters used in the transposed convolutions, e.g., scales of convolutional kernels, may be determined corresponding to those of the transposed convolutions in the first transposed-convolutional module 410. In some embodiments, in order to reduce the computational complexity, the transposed convolution may be implemented by a single transposed-convolutional layer. In other words, for each of the feature channels, the transposed convolution of the input image may be performed by using only a single convolutional kernel, to obtain a corresponding second feature map, i.e., $M_1, \ldots, M_c$ in FIG. 4 correspond to single-convolutional kernels respectively.

In some embodiments, the transposed convolutions applied in feature channels $M_1, \ldots, M_c$ are transposed convolutions with biases-enabled, i.e., corresponding biases, e.g., $b_1 \ldots b_C$ as shown in the figure, are added to outputs of convolutions of respective channels. By enabling biases, the number of learnable parameters is increased, and then the adaption effect for different types of images may be enhanced, which helps to improve the quality of image reconstruction.

The normalizing module 430 is used to generate a plurality of mask maps based on the plurality of second feature maps. In this example, the plurality of second feature maps may be normalized by using a normalizing function (e.g., SOFTMAX function) to generate a plurality of mask maps $m_1 \ldots m_C$.

Figure 5:
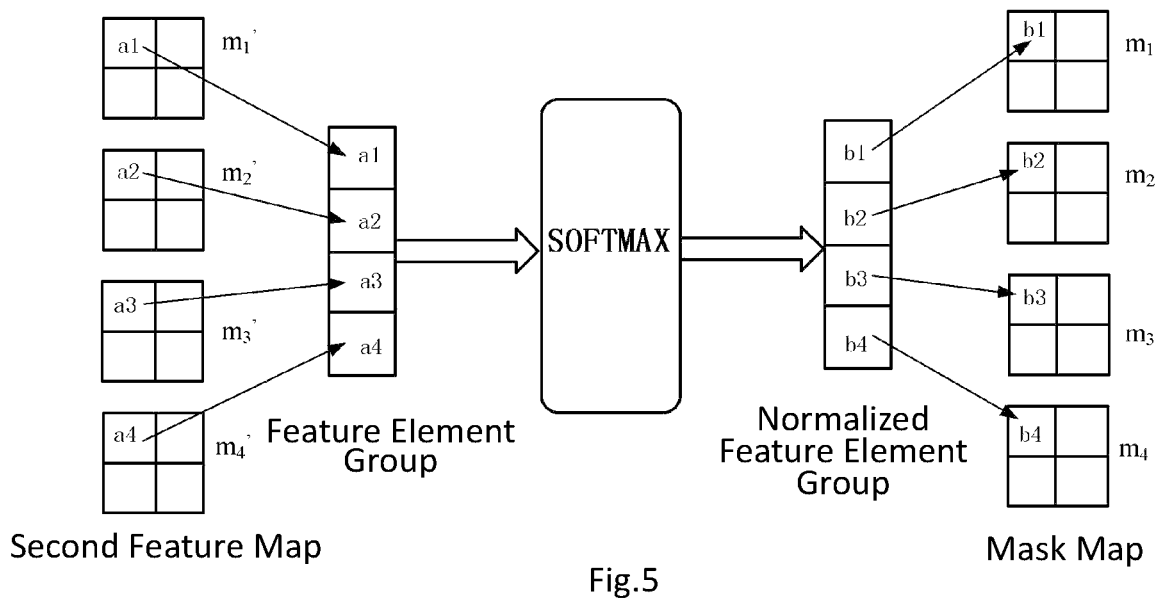
FIG. 5 schematically shows a normalizing process according to some embodiments of the disclosure.

FIG. 5 schematically shows an exemplary normalizing process according to the embodiments of the disclosure. For simplicity, FIG. 5 only shows four 2*2 second feature maps $m_1', m_2', m_3', m_4'$. As shown in FIG. 5, a feature element group may be formed based on feature elements located in corresponding positions in the second feature maps 510. As an example, four feature elements $m_1'(i, j)=a1, m_2'(i, j)=a2, m_3'(i, j)=a3, m_4 (i, j)=a4$ located in the i-th row and j-th column (such as the upper left corner shown in the figure) of the second feature maps may be used to form a feature element group (a1,a2,a3,a4) corresponding to an image position of the i-th row and j-th column, in which i=1, 2, 3, 4, j=1, 2, 3, 4. Subsequently, the feature elements in each feature element group may be normalized to obtain a normalized feature element group (b1,b2,b3,b4). For example, as shown in FIG. 5, the feature element group a may be inputted into a SOFTMAX module as a four-dimensional vector, and a normalized feature element group b is generated by normalizing each element of the vectorusing the SOFTMAX function. Alternatively, the normalization may also be carried out by any other suitable normalizing function, such as Sigmoid function, hyperbolic tangent function, etc.

Elements in the normalized feature element group (b$_1$,b2, b3,b4) corresponding to the image position of the i-th row and j-th column are used as elements in a corresponding position (i.e., the i-th row and the j-th column) of respective mask maps $m_1, m_2, m_3, m_4$. As an example, four feature elements $m_1(i, j), m_2(i, j), m_3(i, j), m_4(i, j)$ located in the i-th row and j-th column in mask maps $m_1, m_2, m_3, m_4$ are set to be normalized feature elements b1,b2,b3,b4 respectively, i.e., $m_1(i, j)=b1, m_2(i, j)=b2, m_3(i, j)=b3, m_4(i, j)=b4$.

It should be understood that although FIG. 5 shows four second feature maps with a size of 2*2, i.e., corresponding to four feature channels, this is only exemplary, and in fact, other numbers of feature channels with other sizes may be defined as desired.

Returning to FIG. 4, the weighted summing module 440 weights each of the first feature maps according to respective feature weights so as to synthesize a reconstructed image Y with a second scale. As shown in FIG. 4, the first feature maps $f_1, \ldots, f_C$ may be multiplied by their corresponding mask maps $m_1, \ldots, m_C$, and the multiplication herein may refer to multiplying each element $f_c(i,j)$ in a first feature map by a corresponding element $m_c(i,j)$ in a corresponding position of a corresponding mask map, i.e., weighting elements in the first feature map based on corresponding feature weights in the same positions of the corresponding mask map. Herein, c represents the first feature map of the c-th feature channel, and i and j represent the i-th row and j-th column of the map. Results of multiplication of these feature channels may be summed, e.g., elements in corresponding positions may be directly added, to obtain a reconstructed image Y, i.e., $Y(i,j)=\Sigma_{C=1}^{C} f_C(i,j)*m_C(i,j)$. In some embodiments, based on the results of multiplication of these feature channels the reconstructed image Y may be obtained in the following way, i.e., $Y(i,j)=\Sigma_{c=1}^{C} f_c(i,j)*m_c(i,j)$, wherein $k_c$ represents the weight of the c feature channel for summing, and the weights for summing may be trained together with other parameters of the model.

According to the solution of the disclosure, the compositional structure of deep-learning is simplified so that each layer has a simple and explicit functionality, which reduces the computational costs and accelerates the operation speed. As a result, the disclosed solution may be regarded as a solution of "instant" reconstruction.

Figure 6:
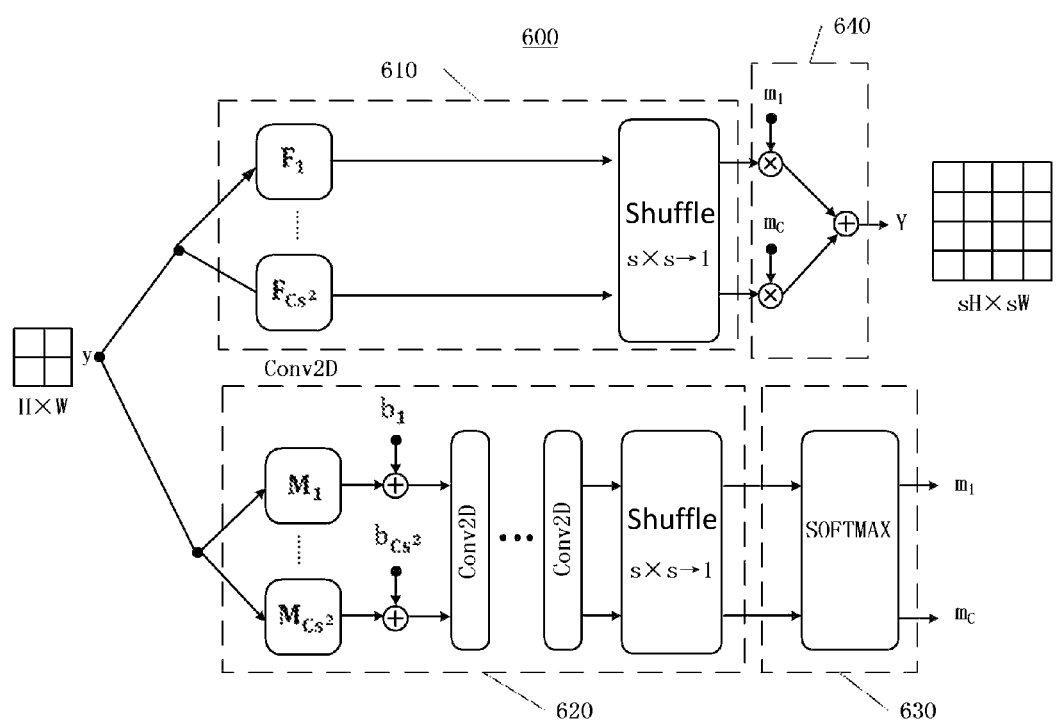
FIG. 6 schematically shows an exemplary structure of another image reconstruction model according to some embodiments of the disclosure.

FIG. 6 shows another exemplary structure of an image reconstruction model according to some embodiments of the disclosure. The image reconstruction model 600 comprises a first convolutional module 610, a second convolutional module 620, a normalizing module 630 and a weighted summing module 640.

The first convolutional module 610 may also be regarded as comprising C feature channels, but during obtaining of first feature maps of these feature channels, each feature channel further comprises $s^2$ sub-channels. As shown in FIG. 6, an input image y may be inputted to $C*s^2$ sub-channels, i.e., $^F1$ to $^FC^s$ shown in the figure, wherein every $s^2$ sub-channels (corresponding to $s^2$ convolutional kernels) (e.g., $^F1$ to $^Fs^2$ or $^F(c-1)s^2+1$ to $^FCs^2$, etc.) may form a sub-channel group, and may be regarded as corresponding to one of the C feature channels. Optionally, the number s of the sub-channels may be determined based at least partially on a target upscaling ratio r, for example, s may be set equal to r.

In some embodiments, in order to reduce the computational complexity, the first convolutional module 610 may comprise a single convolutional layer to perform the convolution. In other words, for each feature channel, the input image may be convolved by only a single convolutional kernel, to obtain a corresponding first initial feature map, i.e., $^F1$ to $^FCs^2$ in FIG. 6 correspond to single-convolutional kernels respectively. Exemplarily, the step of the convolution may be set to be 1, and the size of the convolutional kernel may be set to be k×k. The outputs of $^F1$ to $^FCs^2$ are C first initial feature map groups, each of which corresponds to a sub-channel group and comprises $s^2$ first initial feature maps outputted via $s^2$ sub-channels of the sub-channel group, wherein each first initial feature map has a first scale same as the input image.

For each first initial feature map group, the plurality of first initial feature maps comprised therein may be shuffled to generate a corresponding first feature map. For example, in the first convolutional module 610, the $s^2$ first initial feature maps comprised in each first initial feature map group may be shuffled as a single first feature map with a shuffle module. Specifically, feature elements in a corresponding position of each of the $s^2$ first initial feature maps may be shuffled in a predetermined order to form an image block in a corresponding position of the first feature map.

Figure 7:
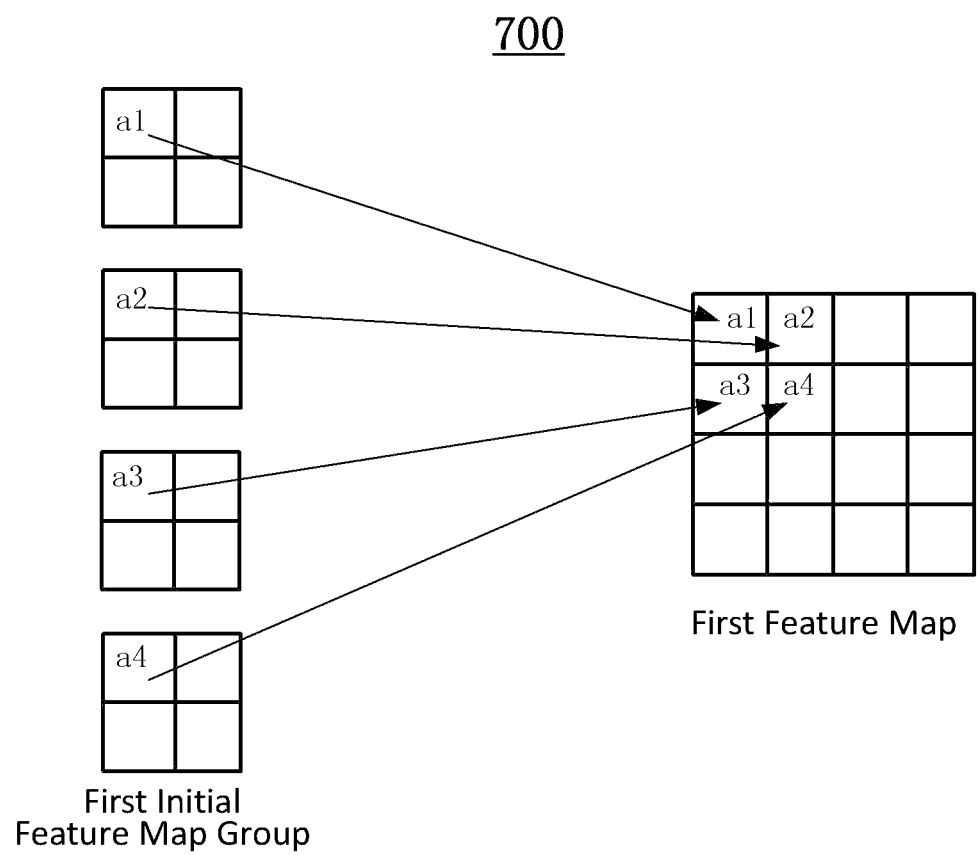
FIG. 7 schematically shows a shuffling process according to some embodiments of the disclosure.

FIG. 7 schematically shows a shuffling process according to the embodiments of the disclosure. As shown in FIG. 7, four elements a1, a2, a3, a4 in the first row, the first column of a first initial feature map group $f_1'$, $f_2'$, $f_3'$, $f_4'$ are used to form a first image block in a first feature map, and the four elements are sequentially arranged in positions of four elements contained in the first image block. Similarly, elements in the i-th row, j-th column of the first initial feature map of the first initial feature map group are used to form an image block in a corresponding position of the first feature map, and these elements are sequentially arranged in positions of elements contained in the image block.

Although FIG. 7 only shows four input images with a size of 2*2 and a reconstructed image with a size of 4*4, this is only exemplary, and the above shuffling process may also be carried out otherwise according to requirements of a reconstruction solution.

Returning to FIG. 6, the second convolutional module 620 comprises C feature channels corresponding to the feature channels of the first convolutional module 610 one by one. During obtaining of second feature maps of the feature channels, each feature channel further comprises $s^2$ sub-channels. In some embodiments, these sub-channels may also correspond to the sub-channels comprised in the feature channels of the first convolutional module 610 one by one. As shown in FIG. 6, the input image y may be inputted to C*$s^2$ sub-channels, i.e., $^M1$ to $^MCs^2$ as shown in the figure, wherein every $s^2$ sub-channels (e.g., $^M1$ to $^MCs^2$ or $^Mc-1$) $S^2+1$ to $^MCs^2$ etc.) may form a sub-channel group. $^M1$ to $^MCs^2$ may correspond to $^F1$ to $^FCs^2$ one by one. Similarly, convolutional parameters used in the second convolutional module 620, such as the number of sub-channels, may also be determined based at least partially on the target upscaling ratio. In some embodiments, in order to reduce the computational complexity, the second convolutional module 620 may be implemented by a single convolutional layer. In other words, for each feature channel, the input image may be convolved by only a single convolutional kernel, to obtain a corresponding second initial feature map, i.e., $^M1$ to $^MCs^2$ in FIG. 6 correspond to single-convolutional kernels respectively. Exemplarily, the step of the convolution may be set to be 1, and the size of the convolutional kernel may be set to be k×k. The outputs of $^M1$ to $^MCs^2$ are C second initial feature map groups, each of which comprises $s^2$ second initial feature maps.

For each second initial feature map group, the $s^2$ second initial feature maps may be shuffled as a single second feature map by a shuffle module. The shuffling process may be the same as it is in the first convolutional module 610.

Optionally, apart from $^M1$ to $^MCs^2$, the second convolutional module 620 may comprise one or more further two-dimensional convolutional layers, which will make the decision of the mask more accurate and facilitate to obtain a reconstructed image with better quality.

The normalizing module 630 and the weighted summing module 640 may work in the same way as the normalizing module 430 and the weighted summing module 440 in FIG. 4.

It should be understood that the method shown in FIG. 3 may be implemented by means of the image reconstruction model shown in FIGS. 4-7, or likewise, by means of any other suitable image reconstruction model.

The image reconstruction model according to the embodiments of the disclosure utilizes a convolutional neural network, which is learning-based and may obtain a better reconstruction effect through training.

Figure 8:
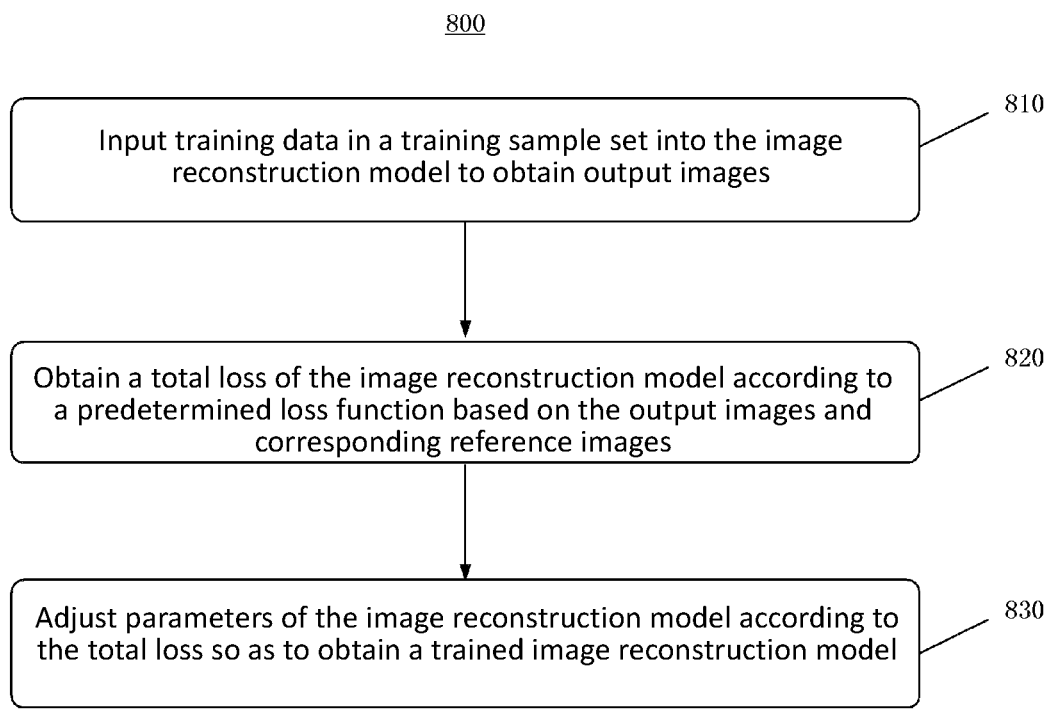
FIG. 8 schematically shows a method for training an image reconstruction model according to some embodiments of the disclosure.

FIG. 8 shows a training method 800 for training an image reconstruction model according to the embodiments of the disclosure. The training method may consider a conventional fidelity (distortion)) metrics $L^{L1}(Y,r)=E[|Y-r|]$ OR $L^{L2}(Y,r)=E[(Y-r)^2]$, where E represents an expected value approximated by an average over a set of training samples, r represents a reference image and Y represents an output image obtained when a degraded image y corresponding to the reference image is input. The image reconstruction model may be a model in the form of FIGS. 4-7.

Degraded images with a lowered resolution may be generated based on a set of reference images to serve as the input images. A degraded image may have a first scale, and a reference image may have a second scale, and a ratio of the second scale to the first scale may be a target upscaling ratio. The target upscaling ratio may be chosen depending on actual needs, e.g., it may be 2, 3, 4, etc. Optionally, the degraded image may be generated in various ways, for example, downsampling, pooling, filtering, etc. In an example, an average of values of several adjacent pixels in the reference image may be used as a pixel value in a corresponding position of the degraded image. Optionally, noise may also be added to the degraded image. In some embodiments, the above processing may be carried out with respect to the luminance channel of the reference image.

Each degraded image together with its corresponding reference image may make a training sample. Thereby, a training sample set may be established based on the reference images and the degraded images generated therefrom.

In step 810, training data in the training sample set may be inputted into the image reconstruction model to obtain corresponding output images. The training data comprises degraded images and reference images.

In step 820, a total loss of the image reconstruction model may be calculated according to a predetermined loss function based on the output images and corresponding reference images. For example, the total loss may be L1 loss or L2 loss, i.e., the adopted loss function is: $L^{L1}(Y,r)=E[|Y-r|]$ OR $L^{L2}(Y,r)=E[(Y-r)^2]$, where E represents an expected value approximated by an average over a set of training samples, r represents a reference image, and Y represents an output image obtained when a degraded version y corresponding to the reference image is inputted. L1 and L2 represent L1 norm and L2 norm, respectively.

In step 830, parameters of the image reconstruction model may be adjusted according to the total loss so as to obtain a trained image reconstruction model. The parameter adjustment will minimize the total loss during the training. The above process may be repeated, and optionally, when the total loss is reduced to a predetermined threshold range or substantially remains unchanged, it may be considered that the training is completed.

In some embodiments, during the training, different feature channels in the image reconstruction model may be arranged to focus on different types of features, such as image features with different gradients, through a preset mechanism, such that the trained image reconstruction model may better extract features in the input image via different feature channels during subsequent use, thereby improving the image quality of the reconstructed image.

Evaluation of an image reconstruction solution according to the embodiments of the disclosure using image and video frames from publicly available datasets shows that, in terms of model parameter amount, running speed and running power under 2 times super-resolution, the solution according to the embodiments of the disclosure significantly improves the running speed and reduces the running power as compared with existing known solutions. In the case of a small model, it may even reach 120FHD/s. FHD here refers to a 1080P image frame. As for image quality of the reconstructed super-resolution and running speed, in the case of a medium image quality (e.g., 30db), the solution according to the disclosure also improves significantly in speed with an output of 60FPS (60 frames per second) for 4 K images.

Figure 9:
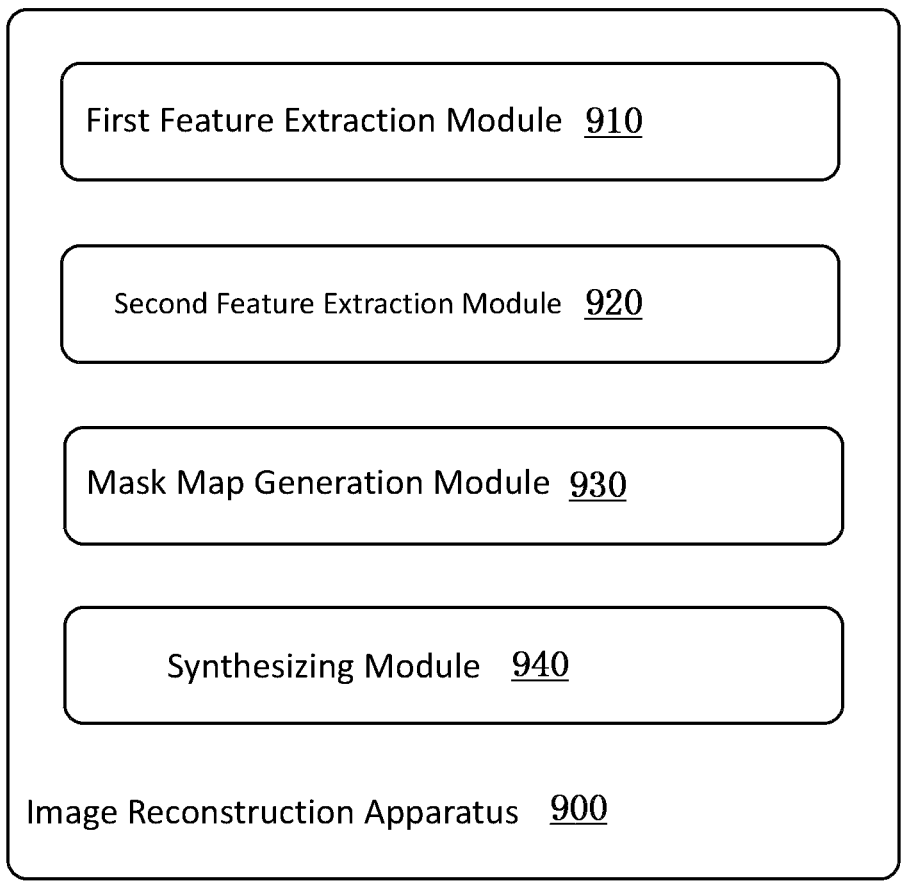
FIG. 9 schematically shows an exemplary structure of an apparatus for image reconstruction in an edge device according to some embodiments of the disclosure.

FIG. 9 schematically shows an exemplary structure of an apparatus 900 for image reconstruction in an edge device according to some embodiments of the disclosure. As shown in FIG. 9, the image reconstruction apparatus 900 comprises a first feature extraction module 910, a second feature extraction module 920, a mask map generation module 930 and a synthesizing module 940.

Specifically, the first feature extraction module 910 may be configured to extract low-level features from an input image of a first scale to generate a plurality of first feature maps, the first feature maps having a second scale upscaled by a target scaling factor as compared with the input image. The second feature extraction module 920 may be configured to extract low-level features from the input image to generate a plurality of second feature maps, the second feature maps having the second scale. The mask map generation module may be configured to generate a plurality of mask maps based on the plurality of second feature maps, each mask map having the second scale and characterizing a feature weight(s) of a corresponding first feature map in the plurality of first feature maps. The synthesizing module 940 may be configured to synthesize a reconstructed image having the second scale by weighting the first feature maps according to respective feature weights.

The image reconstruction apparatus 900 may be deployed on an edge device 110 as shown in FIG. 1. It should be understood that the image reconstruction apparatus 900 may be implemented by software, hardware or a combination thereof. Many different modules may be implemented in a same software or hardware structure, or a module may be implemented by many different software or hardware structures.

Besides, the image reconstruction apparatus 900 may be used to perform the image reconstruction method as described herein, of which related details have been given above, and then will not be repeated herein for simplicity. The image reconstruction apparatus 900 may have the same features and advantages described for the above image reconstruction method.

Figure 10:
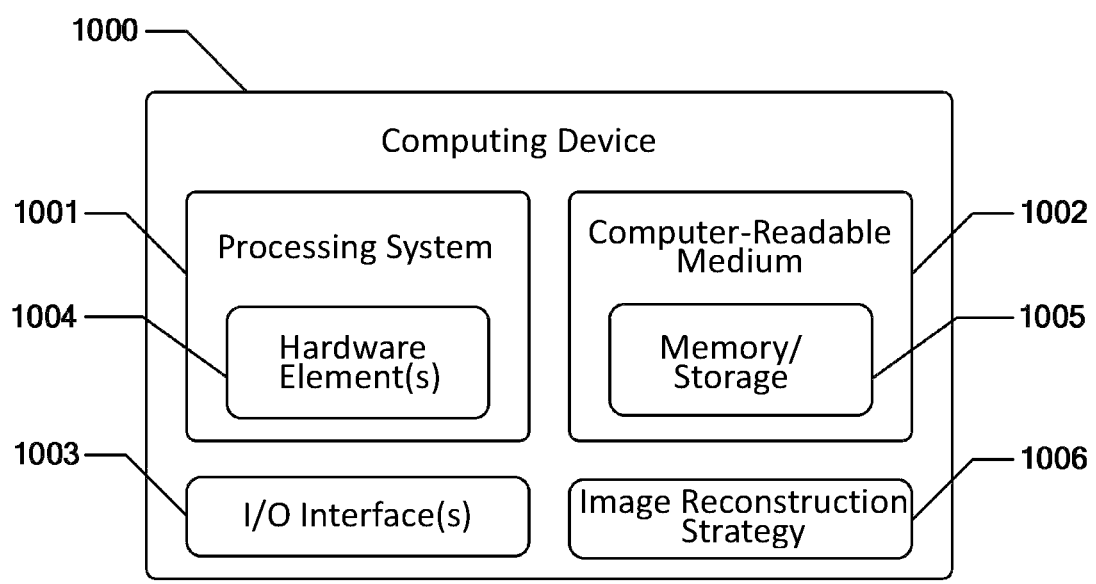
FIG. 10 schematically shows an exemplary architecture of a computing device according to some embodiments of the disclosure.

FIG. 10 schematically shows an exemplary architecture of an electronic device according to some embodiments of the disclosure. For example, it may represent an edge device 110 in FIG. 1.

As shown in the figure, the exemplary electronic device 1000 comprises a processing system 1001, one or more computer-readable mediums 1002 and one or more I/O interfaces 1003 communicatively coupled to each other. Although not shown, the electronic device 1000 may further comprise a system bus or other data and command transmission systems coupling components to each other. The system bus may comprise any one or a combination of different bus structures, and the bus structure may be such as a memory bus or a memory controller, a peripheral bus, a universal serial bus, and/or a processor or a local bus adopting any of various bus architectures, or it may also include control and data lines or the like.

The processing system 1001 represents the functionality of using hardware to execute one or more operations. Therefore, the processing system 1001 may be illustrated as comprising a hardware element 1004 that may be configured as a processor, a functional block, etc. This may include a dedicated integrated circuit realized in hardware or other logic devices formed using one or more semiconductors. The hardware element 1004 is not limited by its forming material or the processing mechanism adopted therein. For example, the processor may consist of semiconductor(s) and/or transistor(s) (e.g., an electronic integrated circuit (IC)). In this context, the processor-executable instructions may be electronically executable instructions.

The computer-readable medium 1002 is illustrated as comprising a memory/storage 1005. The memory/storage 1005 represents a memory/storage associated with one or more computer-readable mediums. The memory/storage 1005 may comprise a volatile storage medium (such as a random access memory (RAM)) and/or a non-volatile storage medium (such as a read only memory (ROM), a flash memory, an optical disc, a magnetic disk and so on). The memory/storage 1005 may comprise a fixed medium (e.g., RAM, ROM, fixed hard drive, etc.) and a removable medium (e.g., a flash memory, a removable hard drive, an optical disk and so on). Exemplarily, the memory/storage 1005 may be used to store various image data mentioned in the above embodiments. The computer-readable medium 1002 may be configured by other means further described below.

One or more input/output interfaces 1003 represent the functionality of allowing a user to input commands and information into the electronic device 1000 and further allowing use of various input/output devices to present information to the user and/or send it to other components or devices. Examples of the input device include keyboards, cursor control devices (e.g., mice), microphones (e.g., for voice input), scanners, touch functions (e.g., capacitive or other sensors configured to detect physical touches), cameras (e.g., visible or invisible wavelengths (such as infrared frequencies) may be used to detect motions that do not involve touches as gestures), network cards, receivers, and so on. Examples of the output device include display devices (e.g., monitors or projectors), loudspeakers, printers, haptic response devices, network cards, transmitters, and so on. Exemplarily, in the embodiments described above, the input image or the image to be reconstructed may be received via the input device, and the reconstructed image may be presented via the output device.

The electronic device 1000 further comprises an image reconstruction strategy 1006. The image reconstruction strategy 1006 may be stored in the memory/storage 1005 as computer program instructions. The image reconstruction strategy 1006 may implement all functions of the modules of the image reconstruction apparatus 900 as described in FIG. 9 together with the processing system 1001 or the like.

Herein various techniques may be described in a general context of software, hardware, elements or program modules. Generally, these modules comprise routines, programs, objects, elements, components, data structures, etc. that perform specific tasks or implement specific abstract data types. The terms of "module", "function", etc. used herein usually represent software, firmware, hardware or a combination thereof. Features of the techniques described herein are unrelated to a platform, which means that these techniques may be implemented in various computing platforms having various processors.

Implementations of the described modules and techniques may be stored on or transmitted across some form of computer-readable media. The computer-readable media may comprise various media accessible by the electronic device 1000. Exemplarily rather than restrictively, the computer-readable media may comprise "computer-readable storage media" and "computer-readable signal media".

Contrary to pure signal transmission, carriers or signals per se, the "computer-readable storage media" refer to media and/or devices capable of storing information permanently, and/or tangible storage. Therefore, the computer-readable storage media refer to non-signal bearing media. The computer-readable storage media comprise for instance volatile and nonvolatile, removable and non-removable media and/or hardware such as storage devices implemented by methods or techniques suitable for storing information (e.g., computer-readable instructions, data structures, program modules, logic elements/circuits, or other data). Examples of the computer-readable storage media may include, but are not limited to, RAMs, ROMs, EEPROMs, flash memories or other memory technologies, CD-ROMs, digital versatile disks (DVDs) or other optical storage devices, hard disks, cassette tapes, magnetic tapes, disk storage or other magnetic storage devices, or other storage devices, tangible media, or articles suitable for storing desired information and accessible by a computer.

The "computer-readable signal media" refer to signal bearing media configured to transmitting instructions to the electronic device 1000 via a network for instance. The signal media may typically embody computer-readable instructions, data structures, program modules, or other data in a modulated data signal such as a carrier, a data signal, or other transmission mechanism. The signal media further comprise any information delivery media. Exemplarily rather than restrictively, the signal media comprise wired networks or direct wired media, and wireless media such as acoustic, RF, infrared, and other wireless media for instance.

As mentioned above, the hardware element 1001 and the computer-readable medium 1002 represent instructions, modules, programmable device logics, and/or fixed device logics implemented in the form of hardware, which in some embodiments may be used to implement at least some aspects of the technique described herein. The hardware element may include integrated circuits or system-on-chips, application-specific integrated circuits (ASICs), field programmable gate arrays (FPGAs), complex programmable logic devices (CPLDs), and other implementations in silicon or components of other hardware devices. In this context, the hardware element may be used as a processing device for executing program tasks defined by instructions, modules and/or logics embodied by the hardware element, and a hardware device for storing instructions for execution, for example, the previously described computer-readable storage medium.

The aforementioned combination may also be used to implement various techniques and modules herein. Therefore, the software, hardware or program modules and other program modules may be implemented as one or more instructions and/or logics on some form of computer-readable storage media and/or embodied by one or more hardware elements 1001. The electronic device 1000 may be configured to implement specific instructions and/or functions corresponding to the software and/or hardware modules. Therefore, by using the computer-readable storage medium and/or the hardware element 1001 of the processing system, for instance, the module may be implemented at least partially in hardware as a module executable by the electronic device 1000 as software. The instructions and/or functions may be executed/operable by, for example, one or more electronic devices 1000 and/or processing systems 1001 to implement the techniques, modules, and examples described herein.

The techniques described herein may be supported by these configurations of the electronic device 1000, and are not limited to the specific examples of the techniques described herein.

It should be understood that the embodiments of the disclosure are described with reference to different functional units for clarity. However, it will be apparent that the functionality of each functional unit may be implemented in a single unit, in multiple units, or as a part of other functional units without departing from the disclosure. For example, a functionality described as being performed by a single unit may be performed by multiple different units. Therefore, references to specific functional units are only regarded as references to appropriate units for providing the described functionality, but do not indicate a strict logical or physical structure or organization. Therefore, the disclosure may be implemented in a single unit, or distributed among different units and circuits both physically and functionally.

By studying the drawings, the disclosure and the appended claims, those skilled in the art may understand and implement variations of the disclosed embodiments when practicing the subject matter sought for protection. In the claims, the wording "comprise" does not exclude the presence of other elements or steps, and "a" or "an" does not exclude the presence of more. The mere fact that certain measures are recited in mutually different dependent claims does not indicate that a combination of these measures cannot be used for advantage.

The invention claimed is:

1. An image reconstruction method for an edge device, the method comprising:
   extracting low-level features from an input image of a first scale to generate a plurality of first feature maps, the plurality of first feature maps having a second scale greater than the first scale as compared with the input image;
   extracting low-level features from the input image to generate a plurality of second feature maps, the plurality of second feature maps having the second scale;
   generating a plurality of mask maps based on the plurality of second feature maps;
   generating a plurality of intermediate feature maps based on the plurality of mask maps and the plurality of first feature maps, the plurality of intermediate feature maps having the second scale; and
   synthesizing a reconstructed image having the second scale based on the plurality of intermediate feature maps.

2. The method according to claim 1, wherein said extracting low-level features from the input image to generate the plurality of first feature maps comprises:
   performing transposed convolution on the input image to generate the plurality of first feature maps; and
   wherein said extracting low-level features from the input image to generate the plurality of second feature maps comprises:
   performing transposed convolution on the input image to generate the plurality of second feature maps.

3. The method according to claim 2, wherein said performing transposed convolution on the input image to generate the plurality of first feature maps comprises:
   processing the input image with a single transposed-convolutional layer to generate the plurality of first feature maps; and wherein said performing transposed convolution on the input image to generate the plurality of second feature maps comprises:
processing the input image with a single transposed-convolutional layer to generate the plurality of second feature maps.

4. The method according to claim 1, wherein said extracting low-level features from the input image to generate the plurality of first feature maps comprises:
performing convolution on the input image to generate a plurality of first initial feature map groups, each first initial feature map group comprising a plurality of first initial feature maps and each first initial feature map having the first scale; and
for each first initial feature map group, generating a corresponding first feature map by shuffling the plurality of first initial feature maps comprised therein, and
wherein said extracting low-level features from the input image to generate the plurality of second feature maps comprises:
performing convolution on the input image to generate a plurality of second initial feature map groups, each second initial feature map group comprising a plurality of second initial feature maps and each second initial feature map having the first scale; and
for each second initial feature map group, generating a corresponding second feature map by shuffling the plurality of second initial feature maps comprised therein.

5. The method according to claim 4, wherein said performing convolution on the input image to generate the plurality of first initial feature map groups comprises:
convolving the input image by using a single convolutional layer to generate the plurality of first initial feature map groups; and
wherein said performing convolution on the input image to generate the plurality of second initial feature map groups comprises: convolving the input image by using a single convolutional layer to generate the plurality of second initial feature map groups.

6. The method according to claim 4,
wherein said performing convolution on the input image to generate the plurality of first initial feature map groups comprises:
convolving the input image by using a single convolutional layer to generate the plurality of first initial feature map groups, and
wherein said performing convolution on the input image to generate the plurality of second initial feature map groups comprises: convolving the input image by using a first convolutional layer and a second convolutional layer to generate the plurality of second initial feature map groups.

7. The method according to claim 4,
wherein a number of first initial feature maps comprised in each first initial feature map group depends on a scaling ratio of the second scale to the first scale, and
wherein a number of second initial feature maps comprised in each second initial feature map group depends on a scaling ratio of the second scale to the first scale.

8. The method according to claim 1,
wherein correspondence exists between the plurality of mask maps and corresponding first feature maps, and each mask map characterizes a feature weight(s) of a corresponding first feature map of the plurality of first feature maps, wherein said generating the plurality of intermediate feature maps based on the plurality of mask maps and the plurality of first feature maps comprises:
generating the plurality of intermediate feature maps by weighting each first feature map based on the feature weight(s) characterized by a corresponding mask map.

9. The method according to claim 1, wherein a number of first feature maps, a number of second feature maps and a number of mask maps are the same, and the mask maps have the second scale.

10. The method according to claim 1, wherein said generating the plurality of mask maps based on the plurality of second feature maps comprises:
forming a plurality of feature element groups based on feature elements in corresponding positions of the plurality of second feature maps;
normalizing feature elements in each feature element group; and
generating the mask maps based on respective normalized feature elements.

11. The method according to claim 1, wherein the mask maps are pixel-level maps, and each mask map has the second scale and comprises a feature weight for each pixel in a corresponding first feature map.

12. The method according to claim 1, wherein the low-level features comprise at least one of texture feature, edge feature and spot feature of the input image.

13. The method according to claim 1, wherein the input image is a luminance channel image of a color image to be reconstructed.

14. The method according to claim 1, wherein operations of the method are executed by using a trained image reconstruction model to reconstruct the input image into a super-resolution image.

15. The method according to claim 14, wherein the image reconstruction model is trained by performing operations comprising:
inputting training data from a training sample set comprising reference images and degraded images to the image reconstruction model, to obtain output images;
obtaining a total loss of the image reconstruction model based on a predetermined loss function according to the output images and the reference images; and
adjusting parameters of the image reconstruction model according to the total loss so as to obtain a trained image reconstruction model.

16. An electronic device, comprising:
a memory configured to store computer-executable instructions; and
a processor configured to perform a method according to claim 1 when the computer-executable instructions are executed by the processor.

17. The electronic device according to claim 16,
wherein correspondence exists between the plurality of mask maps and corresponding first feature maps, and each mask map characterizes a feature weight(s) of a corresponding first feature map of the plurality of first feature maps, and
wherein said generating the plurality of intermediate feature maps based on the plurality of mask maps and the plurality of first feature maps comprises:
generating the plurality of intermediate feature maps by weighting each first feature map based on the feature weight(s) characterized by a corresponding mask map.

18. The electronic device according to claim 16, wherein said generating the plurality of mask maps based on the plurality of second feature maps comprises:
- forming a plurality of feature element groups based on feature elements in corresponding positions of the plurality of second feature maps;
- normalizing feature elements in each feature element group; and
- generating the mask maps based on respective normalized feature elements.

19. A non-transitory computer-readable storage medium, having computer-executable instructions stored thereon, and performing a method according to claim 1 when the computer-executable instructions are executed.

20. The non-transitory computer-readable storage medium according to claim 19,
- wherein correspondence exists between the plurality of mask maps and corresponding first feature maps, and each mask map characterizes a feature weight(s) of a corresponding first feature map of the plurality of first feature maps, and
- wherein said generating the plurality of intermediate feature maps based on the plurality of mask maps and the plurality of first feature maps comprises:
- generating the plurality of intermediate feature maps by weighting each first feature map based on the feature weight(s) characterized by a corresponding mask map.

* * * * *